(12) United States Patent
Li et al.

(10) Patent No.: US 10,779,293 B2
(45) Date of Patent: *Sep. 15, 2020

(54) DOWNLINK TRANSMISSION METHOD AND USER TERMINAL EQUIPMENT

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,085

(22) Filed: Oct. 21, 2019

(65) Prior Publication Data

US 2020/0053742 A1    Feb. 13, 2020

Related U.S. Application Data

(63) Continuation of application No. 16/561,498, filed on Sep. 5, 2019, now Pat. No. 10,609,717, which is a
(Continued)

(30) Foreign Application Priority Data

Sep. 3, 2013  (CN) .......................... 2013 1 0394991
Sep. 17, 2013  (CN) .......................... 2013 1 0424907
Oct. 28, 2013  (CN) .......................... 2013 1 0515958

(51) Int. Cl.
*H04L 5/00* (2006.01)
*H04W 72/08* (2009.01)
(Continued)

(52) U.S. Cl.
CPC .......... *H04W 72/085* (2013.01); *H04B 17/24* (2015.01); *H04B 17/309* (2015.01);
(Continued)

(58) Field of Classification Search
CPC ..... H04L 1/0003; H04L 1/009; H04L 1/0016; H04L 27/362; H04L 27/366; H04W 72/042; H04W 72/1231
See application file for complete search history.

(56) References Cited

U.S. PATENT DOCUMENTS 9,642,118 B2  5/2017  Lahetkangas
9,832,784 B2  11/2017  Einhaus
(Continued)

FOREIGN PATENT DOCUMENTS

CN    101273551    9/2008
CN    101741508    6/2010
(Continued)

OTHER PUBLICATIONS

Panasonic, "MCS Table Adaptation for Low Power ABS", R1-124232, 3GPP TSG-RAN WG1 Meeting 70bis, Oct. 8-12, 2012, 7 pages.
(Continued)

*Primary Examiner* — Gbemileke J Onamuti
(74) *Attorney, Agent, or Firm* — The Farrell Law Firm, P.C.

(57) ABSTRACT

Disclosed is a method for communication by a user equipment in a wireless communication system, including receiving configuration information from a base station, performing measurement of a downlink channel based on the configuration information, identifying a channel quality indicator (CQI) table among a plurality of CQI tables including a first CQI table which includes CQI indices related to a 256 quadrature amplitude modulation (QAM) scheme and a second CQI table which does not include a CQI index related to the 256 QAM scheme, identifying the CQI index in the identified CQI table based on the measurement, and reporting the identified CQI index to the base station, wherein each of the plurality of CQI tables includes CQI indices indicating modulation schemes and code rates,
(Continued)

and wherein a 64 QAM scheme with a highest coding rate indicated in the second CQI table is absent in the first CQI table.

16 Claims, 5 Drawing Sheets

Related U.S. Application Data continuation of application No. 16/263,793, filed on Jan. 31, 2019, now Pat. No. 10,448,413, which is a continuation of application No. 16/031,317, filed on Jul. 10, 2018, now Pat. No. 10,455,594, which is a continuation of application No. 14/916,399, filed as application No. PCT/KR2014/002289 on Mar. 18, 2014, now Pat. No. 10,257,841.

(51) Int. Cl.
| | | |
|---|---|---|
| *H04W 72/04* | (2009.01) | |
| *H04W 72/12* | (2009.01) | |
| *H04L 1/00* | (2006.01) | |
| *H04B 17/309* | (2015.01) | |
| *H04B 17/24* | (2015.01) | |
| *H04L 27/36* | (2006.01) | |

(52) U.S. Cl.
CPC .......... *H04L 1/0003* (2013.01); *H04L 1/0009* (2013.01); *H04L 1/0016* (2013.01); *H04L 5/006* (2013.01); *H04L 5/0046* (2013.01); *H04L 5/0057* (2013.01); *H04L 27/362* (2013.01); *H04L 27/366* (2013.01); *H04W 72/042* (2013.01); *H04W 72/1231* (2013.01)

(56) References Cited

U.S. PATENT DOCUMENTS

| | | |
|---|---|---|
| 2005/0289256 A1 | 12/2005 | Cudak et al. |
| 2007/0104150 A1 | 5/2007 | Fernandez-Corbaton et al. |
| 2007/0259671 A1 | 11/2007 | Cheng et al. |
| 2009/0130985 A1 | 5/2009 | Lee et al. |
| 2009/0196190 A1 | 8/2009 | Li et al. |
| 2012/0201165 A1 | 8/2012 | Ko et al. |
| 2013/0021980 A1 | 1/2013 | Yang |
| 2013/0070703 A1 | 3/2013 | Yasukawa et al. |
| 2013/0223255 A1 | 8/2013 | Enescu |
| 2014/0071848 A1 | 3/2014 | Park |
| 2014/0192732 A1 | 7/2014 | Chen |
| 2014/0313985 A1 | 10/2014 | Nimbalker |
| 2015/0200746 A1 | 7/2015 | Pan et al. |
| 2015/0365181 A1 | 12/2015 | Nagata et al. |
| 2017/0231000 A1 | 8/2017 | Nagata et al. |

FOREIGN PATENT DOCUMENTS

| | | |
|---|---|---|
| CN | 102045861 | 5/2011 |
| CN | 102624481 | 8/2012 |
| CN | 102624501 | 8/2012 |
| CN | 102934504 | 2/2013 |
| EP | 2 073 417 | 6/2009 |
| JP | 2014-168224 | 9/2014 |
| WO | WO 2012/011658 | 1/2012 |
| WO | WO 2013/051983 | 4/2013 |
| WO | WO 2013/123961 | 8/2013 |

OTHER PUBLICATIONS

Panasonic, "CCE Aggregation Size and Transport Format Signaling", R1-073608, 3GPP TSG-RAN WG1 Meeting #50, Aug. 20-24, 2007, 8 pages.

Chinese Office Action dated Feb. 26, 2018 issued in counterpart application No. 201310515958.X, 16 pages.

Japanese Office Action dated Feb. 26, 2018 issued in counterpart application No. 2016-540784, 11 pages.

PCT/ISA/210 Search Report issued on PCT/KR2014/002289 (pp. 4).

PCT/ISA/237 Written Opinion issued on PCT/KR2014/002289 (pp. 4).

Panasonic, "Discussion on 256QAM for Downlink in Small Cell Deployments", R1-131328, 3GPP TSG-RAN WG1 Meeting 72bis, Apr. 15-19, 2013, 6 pages.

European Search Report dated Apr. 3, 2017 issued in counterpart application No. 14841653.0-1875, 9 pages.

U.S. Office Action dated Sep. 7, 2018 issued in counterpart U.S. Appl. No. 16/031,317, 16 pages.

U.S. Office Action dated Mar. 22, 2019 issued in counterpart U.S. Appl. No. 16/031,317, 21 pages.

ZTE, "Consideration on High Order Modulation for Small Cell", R1-130136, 3GPP TSG-RAN WG1 Meeting #72, Jan. 28-Feb. 1, 2013, 6 pages.

Korean Office Action dated Jun. 29, 2020 issued in counterpart application No. 10-2016-7005022, 8 pages.

DOWNLINK TRANSMISSION METHOD AND USER TERMINAL EQUIPMENT

PRIORITY

This is a Continuation of U.S. patent application Ser. No. 16/561,498, filed in the U.S. Patent and Trademark Office on Sep. 5, 2019, which is a Continuation of U.S. patent application Ser. No. 16/263,793, filed in the U.S. Patent and Trademark Office on Jan. 31, 2019, now U.S. Pat. No. 10,448,413, issued on Oct. 15, 2019, which is a Continuation of U.S. patent application Ser. No. 16/031,317, filed with the U.S. Patent and Trademark Office on Jul. 10, 2018, which is a Continuation of U.S. patent application Ser. No. 14/916,399, filed with the U.S. Patent and Trademark Office on Mar. 3, 2016, now U.S. Pat. No. 10,257,841, issued on Apr. 9, 2019, which is a National Phase Entry of PCT International Application No. PCT/KR2014/002289, which was filed on Mar. 18, 2014, and claims priority to Chinese Patent Application No. 201310394991.1, which was filed on Sep. 3, 2013, Chinese Patent Application No. 201310424907.6, which was filed on Sep. 17, 2013, and Chinese Patent Application No. 201310515958.X, which was filed on Oct. 28, 2013, the content of each of which is incorporated herein by reference.

1. FIELD OF THE DISCLOSURE

The present invention relates to wireless communication system, and more particularly to a downlink transmission method and a user terminal equipment.

2. BACKGROUND OF THE RELATED ART

In 3GPP LTE system, each wireless frame has a length of 10 ms, and is divided into ten equally sized subframes. A downlink transmission time interval (TTI) is defined in one subframe. As shown in FIG. 1, each downlink subframe includes two slots. For a normal cyclic prefix (CP) length, each slot contains 7 OFDM symbols; for an extended cyclic-prefix length, each slot contains 6 OFDM symbols. In each subframe, the front n (n is equal to 1, 2 or 3) OFDM symbols are to transmit downlink control information including a physical downlink control channel (PDCCH) and other control information; the remaining OFDM symbols are to transmit Physical Downlink Shared Channel (PDSCH) or enhanced PDCCH (E PDCCH). The resource allocation granularity is a physical resource block (PRB). One PRB contains 12 consecutive subcarriers in frequency and corresponds to a time slot in time. In one subframe, two PRBs respectively located in two slots of the subframe while occupying same subcarriers are referred to as a PRB pair. In each PRB pair, each resource elements (RE) is the smallest unit of time-frequency resources, i.e., a subcarrier in frequency and an OFDM symbol in time. RE can be used for different functions, respectively. For example, some RE can be used to transmit cell-specific reference signal (CRS), user-specific demodulation reference signal (DMRS) and channel quality indicator reference signal (CSI-RS), etc.

In LTE system, multiple transmission modes are defined for transmitting data. For example, for downlink direction, there are closed loop multiple-input multiple-output (MIMO) transmission mode, open loop MIMO transmission mode, transmit diversity transmission, and so on. For one transmission mode, the system configures a normal downlink control informal (DCI) format which is to complete normal data transmission under this kind of transmission mode. Meanwhile, the base station also configures a User Equipment (UE) to detect one kind of fallback DCI format. The fallback DCI format usually has fewer bits, adopts a more conservative way to schedule data, such as transmit diversity or single-antenna sending data, and thus has high reliability.

In LTE system, DCIs which are sent to different UEs or have different functions can be independently coded and transmitted. When performing physical resource mapping on PDCCH, taking control channel Element (CCE) as a unit; when performing physical resource mapping on EPDCCH, taking enhanced CCE (ECCE) as a unit. In following description, when it is not needed to specifically distinguish PDCCH and EPDCCH, they can be collectively referred to as (E)PDCCH; accordingly, CCE and ECCE can be collectively referred to as (E)CCE. Specifically, modulation symbols of one (E)PDCCH can be mapped to L (E)CCE, where L can be equal to 1, 2, 4, 16 or 32, and L can also be known as aggregation level of (E)PDCCH. (E)PDCCH fixed adopts QPSK modulation method; according to bit number of control information and link condition of UE, the base station can select aggregation level of (E)CCE for sending (E)PDCCH.

In the existing LTE versions, downlink data transmission based on QPSK, 16 Quadrature Amplitude Modulation (QAM) and 64 QAM can be supported. Table 1 shows indexes of modulation coding scheme (MCS) and transport block size (TBS) which are used for downlink transmission. Specifically, in the existing LTE versions, in DCI information, 5 bits are used to indicate MCS and TBS information, in which 29 code words simultaneously indicate modulation mode and TBS, the last 3 code words only indicate modulation mode, while TBS information can be obtained according to previous DCI information and be used for retransmission of PDSCH.

TABLE 1

MCS and TBS for PDSCH transmission

| MCS index $I_{MCS}$ | modulation order $Q_m$ | TBS index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Accordingly, in order to support the base station scheduling downlink PRB resource, UE needs to report channel status indication (CSI) information including channel quality indicator (CQI) information. Table 2 shows modulation mode and code rate, etc. of each CQI index. Specifically, in the existing LTE version, 4 bits are used to report CQI information. Consistent with MCS configuration in the existing LTE version, in CQI measurement, only situations in which downlink data transmissions based on QPSK, 16 QAM and 64 QAM can be currently supported.

TABLE 2

| CQI information | | | |
|---|---|---|---|
| CQI index | coding | code rate × 1024 | efficiency |
| 0 | | invalid value | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

In LTE version 12, in order to add a peak downlink transmission rate of a small cell, one possible candidate technique is to support PDSCH transmission based on 256 QAM modulation. In a typical network configuration, for example, uses a macro base station on lower frequencies to achieve large coverage; and sets some small base stations on higher frequencies to achieve hotspot coverage. Since the small base station uses high frequency point, its propagation characteristics determine inter-cell interference is small and there is not interference from the macro base station, thus, signal to interference and noise ratio of UE in smaller cell can be very high and can sufficiently support downlink transmission based on 256 QAM. In order to introduce the support for 256 QAM, it is needed to modify processing way of MCS and CQI in the existing LTE specifications and solve a series of resulting problems.

SUMMARY

The present application discloses a downlink transmission method and user terminal equipment, which can support 256 QAM modulation and optimize performance of downlink transmission.

In order to achieve the above object, the present application provides a method for communication by a user equipment in a wireless communication system, including receiving configuration information from a base station, performing measurement of a downlink channel based on the configuration information, identifying a CQI table among a plurality of CQI tables including a first CQI table which includes CQI indices related to a 256 QAM scheme and a second CQI table which does not include a CQI index related to the 256 QAM scheme, identifying the CQI index in the identified CQI table based on the measurement, and reporting the identified CQI index to the base station, wherein each of the plurality of CQI tables includes CQI indices indicating modulation schemes and code rates, and wherein a 64 QAM scheme with a highest coding rate indicated in the second CQI table is absent in the first CQI table.

Also provided is a UE comprising a transceiver, and at least one processor coupled to the transceiver, wherein the at least one processor is configured to receive configuration information from a base station, perform measurement of a downlink channel based on the configuration information, identify a CQI table among a plurality of CQI tables including a first CQI table which includes CQI indices related to a 256 QAM scheme and a second CQI table which does not include a CQI index related to the 256 QAM scheme, identify the CQI index in the identified CQI table based on the measurement, and report the identified CQI index to the base station, wherein each of the plurality of CQI tables includes CQI indices indicating modulation schemes and code rates, and wherein a 64 QAM scheme with a highest coding rate indicated in the second CQI table is absent in the first CQI table.

Also provided is a method for communication by a base station in a wireless communication system, including transmitting configuration information for measurement of a downlink channel to a UE, and receiving, from the UE, a report including a CQI index which is identified based on the measurement in a CQI table among a plurality of CQI tables including a first CQI table which includes CQI indices related to a 256 QAM scheme and a second CQI table which does not include a CQI index related to the 256 QAM scheme, wherein each of the plurality of CQI tables includes CQI indices indicating modulation schemes and code rates, and wherein a 64 QAM scheme with a highest coding rate indicated in the second CQI table is absent in the first CQI table.

Also provided is a base station in a wireless communication system, including a transceiver, and at least one processor coupled to the transceiver, wherein the at least one processor is configured to transmit configuration information for measurement of a downlink channel to a UE, and receive, from the UE, a report including a CQI index which is identified based on the measurement in a CQI table among a plurality of CQI tables including a first CQI table which includes CQI indices related to a 256 QAM scheme and a second CQI table which does not include a CQI index related to the 256 QAM scheme, wherein each of the plurality of CQI tables includes CQI indices indicating modulation schemes and code rates, and wherein a 64 QAM scheme with a highest coding rate indicated in the second CQI table is absent in the first CQI table.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

In order to make the objective, technical solution and advantage of the present application clearer, the present application will be described in further detail hereinafter with reference to accompanying drawings.

The existing version of LTE only supports three kinds of modulation modes including QPSK, 16 QAM and 64 QAM. These 3 kinds of modulation modes cover transmission requirements under a variety of typical situations. That is, supporting transmissions based on QPSK when channel conditions are very poor, and supporting transmissions based on 64 QAM when the channel conditions are very good. Only for some scenes of particularly high SINR, downlink transmission can be performed based on 256 QAM, thereby improving downlink peak rate. In fact, even in case of good channel conditions, considering dynamic changes of interference, fast fading and slow fading of links, corner effects, etc., link status of UE is not always capable of performing downlink transmission based on 256 QAM; that is to say, it is needed to support switching between modulation modes such as 256 QAM, 64 QAM, 16 QAM and QPSK. In some situations, MCS table or CQI table of the existing version of LTE is already suitable for downlink transmission of UE; while in some other situations, MCS table or CQI table which are newly defined for supporting 256 QAM is more suitable for processing downlink transmission of UE.

Figure 1:
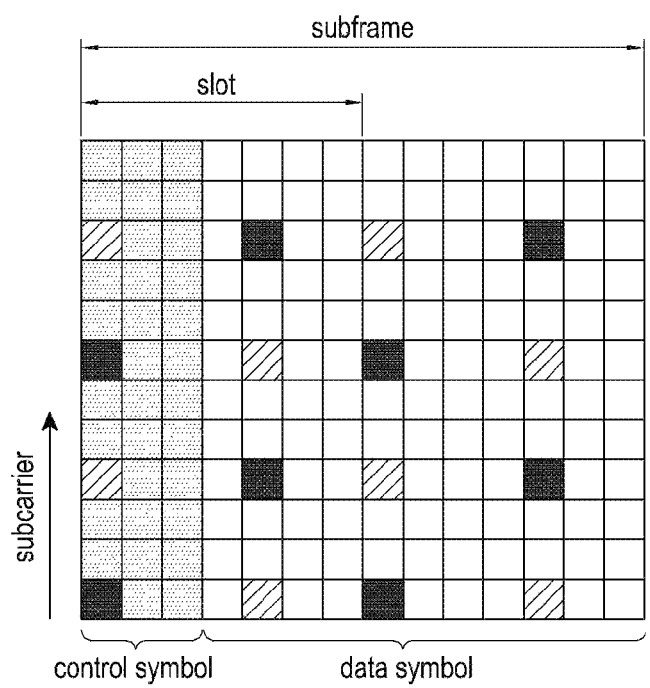
FIG. 1 is a schematic diagram of a subframe.
Figure 2:
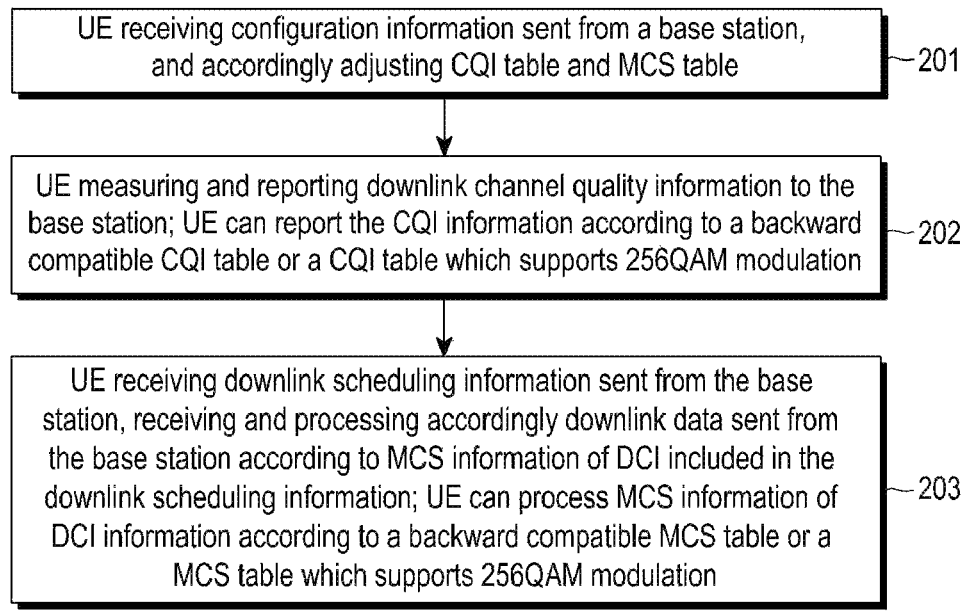
FIG. 2 is a flowchart of a downlink transmission method of the present application.

FIG. 2 is specific flowchart of a downlink transmission method of the present application. As shown in FIG. 2, the method includes:

Block 201: UE receiving configuration information sent from a base station, and accordingly adjusting CQI table and MCS table.

In the block 201, in default situation, UE uses CQI table and MCS table of the existing version of LTE, this ensures that UE can successfully access a base station of the existing version of LTE and a base station of the new version of LTE. In fact, since a base station does not know whether UE supports transmissions of 256 QAM before UE reports its capabilities, thus, the system must work according to the existing version of LTE at this moment. For UE supporting 256 QAM, when the base station knows that link status of UE can support transmissions of 256 QAM, a high layer signaling can be adopted to configure UE to work in a mode of supporting 256 QAM. At this moment, both of MCS table and CQI table will be changed relative to the existing LTE standard, so as to provide support for 256 QAM, and related parameters needs to be set. In following block 202 and block 203, the related parameters which may need to be set will be described in details.

Block 202: UE measuring and reporting downlink channel quality information to the base station; here, UE can report the CQI information according to a backward compatible CQI table or a CQI table which supports 256 QAM modulation;

In the block 202, a CQI table of the existing LTE version can be extended to add support for 256 QAM. Two prefer ways of configuring CQI table are described as follows.

A first way is to define one or more new CQI tables which support 256 QAM, based on CQI table of the existing LTE version. Recording a number of the new CQI tables is N, then, N+1 CQI tables can be supported in the new version of LTE system. When it is needed to configure UE to use 256 QAM, the base station uses a high layer signaling to configure UE to use CQI tables supporting 256 QAM. For example, if defining only one new CQI table which supports 256 QAM, 1 bit signaling can be used to configure UE to use CQI table of the existing LTE standard or the CQI table which supports 256 QAM.

Assuming that average channel status of one UE is very good and can support 256 QAM, then, the possibility that the same UE is in a very bad channel status in short time is usually small. Therefore, one way of generating CQI table which supports 256 QAM can be to remove some CQI item having lower modulation order from the existing CQI table and add items which uses 256 QAM. A preferred way of the present application is described as follows. Here, consistent with the existing CQI table, CQI index 0 can be used to indicate invalid CQI value; or, in a table supporting 256 QAM, all 16 values indicate valid CQI information.

In the first kind of ways, one way of generating CQI table which supports 256 QAM can be to remove some CQI item having the lowest spectrum efficiency from the existing CQI table, renumber the remaining CQI items for QPSK/16 QAM/64 QAM in return, and then add items for 256 QAM. For example, removing 5 items having the lowest index from the existing CQI table, 5 items which support 256 QAM can be added accordingly. Here, some CQI items refer to one or more CQI items.

For situations in which channels of UE can support 256 QAM, in order to deal with the case of deep fading occurring on the channels of UE, it may be necessary to retain some QPSK items having lower coding rate. In this way, when configuring CQI table of 256 QAM, another way of generating CQI table which supports 256 QAM can be to, on the premise of keeping some QPSK items having lowest or lower coding rate in the existing CQI table unchanged, remove some QPSK, even 16 QAM items, renumber the remaining CQI items for QPSK/16 QAM/64 QAM in return, and then add items for 256 QAM. For example, removing indexes 2~6 from the existing CQI table, 5 items which support 256 QAM can be added accordingly.

Still another way of generating CQI table which supports 256 QAM can be to, based on the existing CQI table, increase feedback granularity of CQI items having lower spectrum efficiency; for example, for CQI items having lower spectrum efficiency, retaining only one of every two CQI items, i.e., removing CQI items 2, 4, 6 and 8; renumber the remaining CQI items for QPSK/16 QAM/64 QAM in return and then add items for 256 QAM. Application of this way, the CQI table which supports 256 QAM, still can cover all channel statuses, just increasing granularity of CQI items having lower spectrum efficiency.

All the above ways are to remove some items from the existing CQI table and renumber the remaining CQI items; when defining new CQI table which supports 256 QAM, some items to be removed from CQI table can also be directly replaced with items of 256 QAM, without changing modulation orders and spectrum efficiencies represented by other CQI items of CQI table. Specifically, corresponding to the above ways of removing CQI table items, some CQI items having lower spectrum efficiency of the existing CQI table can be replaced with items of 256 QAM; or, on the premise of keeping some QPSK items having lowest or lower coding rate in the existing MCS table unchanged, some QPSK even 16 QAM items can be replaced with items of 256 QAM; or, based on the existing CQI table, increasing feedback granularity of CQI items having lower spectrum efficiency, for example, for CQI items having lower spectrum efficiency, one of every two CQI items can be replaced with items of 256 QAM.

In the above ways of generating CQI table which supports 256 QAM, CQI items having lower spectrum efficiency can be reduced to indicate 256 QAM. In fact, CQI table in the existing standard can support 64 QAM and coding rate as high as 0.92, on the premise that UE can support 256 QAM, the performance of using 64 QAM and coding rate as high as 0.92 may be not optimized, and they may be replaced with some CQI items which based on 256 QAM transmission. That is to say, in addition to the above mentioned reducing some CQI items having lower spectrum efficiency to indicate 256 QAM, one or more items of 64 QAM having highest coding rate can be removed to indicate 256 QAM. Specifically, one manner of removing one or more items of 64 QAM to indicate 256 QAM, can be used separately to generate new CQI table, and can also be combined with the above mentioned manner of reducing some CQI items having lower spectrum efficiency to indicate 256 QAM to generate new CQI table.

A second kind of ways is to add items corresponding to 256 QAM in CQI table of the existing version of LTE, thereby obtaining a long CQI table of a length more than 16 items, i.e., the long CQI table contains information of more than 16 items of CQI indexes. At this moment, since the length of the CQI table is more than 16 items, thus, it is needed to reconsider reporting manner of CQI information.

One reporting manner can be to add number of bits through which UE reports CQI information; for example, using 5 bits to feedback CQI.

Or, a bit number of 4 bit CQI information can also remain unchanged, and thus CQI reporting mechanism of the existing version of LTE can be directly be reused. Further, at the time feeding back 4 bit CQI information, UE can feed back an offset value for indicating an actual index of CQI information reported by the base station in the long CQI table which supports 256 QAM modulation. For example, recoding a value of 4 bit CQI is c and an offset value is v, CQI value c which is equal to 0 can still represent invalid CQI value; while for CQI value c is equal to 1~15, an actual index of CQI fed back by UE is CQI index c+v of the above long CQI table. The offset value v and rank indication (RI) information of CSI feedback information of UE can be joint coded and feed back at a same timing position.

Or, 4 bit CQI can also remain unchanged, and thus the CQI reporting mechanism of the existing version of LTE can be directly be reused. When it is needed to configure UE to use 256 QAM, the base station uses a high layer signaling to configure an offset value v of CQI table for UE, and UE extracts 16 CQI items from the above long CQI table according to the offset value v so as to form a CQI table which actually configures UE. In the actual configuration CQI table, CQI value 0 can still represent invalid CQI value; while CQI value c (c is equal to 1~15) can be mapped in turn to CQI index c+v of the above long CQI table.

Figure 3:
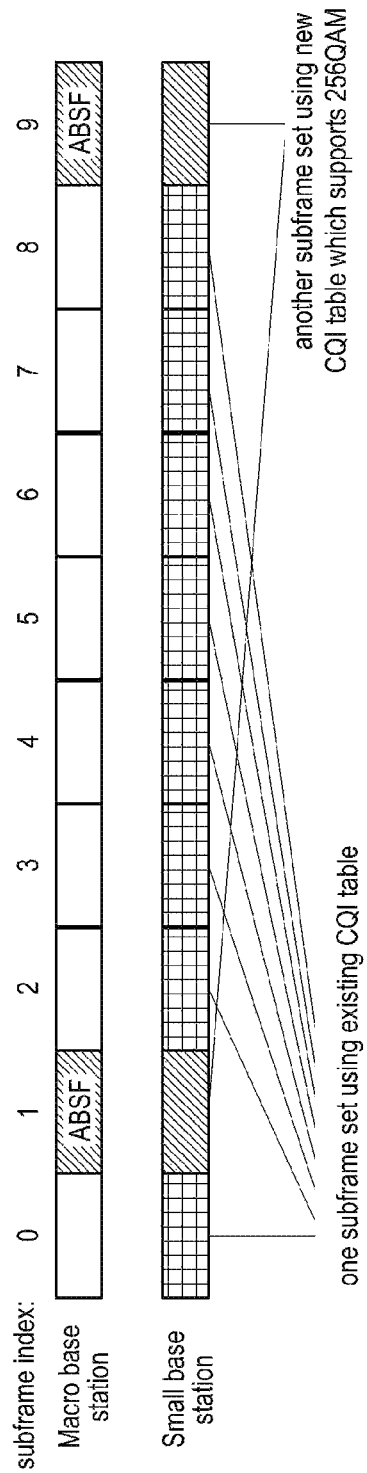
FIG. 3 is a schematic diagram showing different CSI processes uses different CQI tables.

In the existing version 10 of LTE, in order to support eICIC technique, downlink subframes of a cell can be divided into two sets, and channel statuses of the two are different. Accordingly, CSI information can be fed back for the two subframe sets, respectively. That is, the base station can configure UE to report feedback information of the two subframe sets, respectively. Average SINR levels of the above multiple subframe sets are usually different. As shown in FIG. 3, taking eICIC as example, one subframe set configured with ABSF corresponding to macro base station, that is, interference on a smaller cell from the macro base station is smaller, thus, SINR of UE in smaller cell can be very high and may be suitable for using the modulation mode of 256 QAM. For the other subframe set, since the macro base station sends downlink control and downlink data, thus, SINR of UE is smaller and may not be suitable for using the modulation mode of 256 QAM.

The present application provides, when the base station configures multiple subframe sets of UE, configuring information of CQI table used by each subframe set, respectively. If defining new table for 256 QAM, then, in the present application, UE is configured to use CQI table of the existing version of LTE or new CQI table which supports 256 QAM, according to SINR situation of this subframe set. If defining the above long CQI table, then, in the present application, UE is configured to select an offset value v of CQI index from the long CQI table, according to SINR situation of this subframe set. For example, CQI value 0 can still represent invalid CQI value; while CQI value c (c is equal to 1~15) can be mapped in turn to CQI index c+v of the above long CQI table. In this way, when the base station configures CSI reporting manner for UE, the base station can configure information of CQI table used in each subframe set, respectively. Accordingly, UE receives information of CQI table configured by the base station for each subframe set, respectively, measures channel status for each subframe set, and feeds back CQI information according to CQI table configured by the base station for this subframe set.

In the version 11 of LTE, in order to support data transmission of CoMP, the base station further supports configuring UE to report feedback information of multiple CSI processes, and each CSI process can further be divided into two subframe sets. In conclusion, the existing LTE system already supports configuring UE to feed back feedback information of multiple CSI processes and multiple subframe sets. Average SINR levels of the above multiple CSI processes and multiple subframe sets are usually different. In some CSI processes and subframe sets, SINR of UE can be very high and may be suitable for using the modulation mode of 256 QAM; while in other CSI processes and subframe sets, SINR of UE is smaller and may not be suitable for using the modulation mode of 256 QAM.

The present application provides, when the base station configures multiple CSI processes of UE, configuring information of CQI table used in each CSI process, respectively. If defining new table for 256 QAM, then, in the present application, UE is configured to use CQI table of the existing version of LTE or new CQI table which supports 256 QAM, according to SINR situation of this CSI process. If defining the above long CQI table, then, in the present application, UE is configured to select an offset value v of CQI index from the long CQI table, according to SINR situation of this CSI process. For example, CQI value 0 can still represent invalid CQI value; while CQI value c (c is equal to 1~15) can be mapped in turn to CQI index c+v of the above long CQI table. In this way, when the base station configures CSI reporting manner for UE, the base station can configure information of CQI table used in each CSI process, respectively. Accordingly, UE receives information of CQI table configured by the base station for each CSI process, respectively, measures channel status for each CSI process, and feeds back CQI information according to CQI table configured by the base station for this CSI process.

The present application further provides, when the base station configures multiple CSI processes and multiple subframe sets of UE, configuring information of CQI table used in each CSI process and by each subframe set, respectively. If defining new table for 256 QAM, then, in the present application, UE is configured to use CQI table of the existing version of LTE or new CQI table which supports 256 QAM, according to SINR situation of one CSI process and one subframe set. If defining the above long CQI table, then, in the present application, UE is configured to select an offset value v of CQI index from the long CQI table, according to SINR situation of one CSI process and one subframe set. For example, CQI value 0 can still represent invalid CQI value;

while CQI value c (c is equal to 1~15) can be mapped in turn to CQI index c+v of the above long CQI table. In this way, when the base station configures CSI reporting manner for UE, the base station can configure information of CQI table used in each CSI process and by each subframe set, respectively. Accordingly, UE receives information of CQI table configured by the base station for each CSI process and each subframe set, respectively, measures channel status for each CSI process and each subframe set, and feeds back CQI information according to CQI table configured by the base station for this CSI process and this subframe set.

Block 203: UE receiving downlink scheduling information sent from the base station, receiving and processing accordingly downlink data sent from the base station according to MCS information of DCI included in the downlink scheduling information. Here, UE can process MCS information of DCI information according to a backward compatible MCS table or a MCS table which supports 256 QAM modulation.

In the block 203, an MCS table of the existing LTE version can be extended to add support for 256 QAM. Two prefer ways of configuring MCS table are described as follows.

A first kind of ways is to define one or more new MCS tables which support 256 QAM based on MCS table of the existing version of LTE. Recording a number of the new MCS tables is N, then, N+1 MCS tables can be supported in the new version of LTE system. Here, base stations supporting 256 QAM can be divided into different levels. For example, a simple device only supports using 256 QAM in a not high encoding rate; while a complex device supports using 256 QAM in high encoding rate. Different MCS tables of 256 QAM can be configured for base stations which are of different levels and supports 256 QAM, respectively. This is one reason why defines multiple MCS tables which supports 256 QAM in above. Or, in order to simplify the design, only one general new MCS table can be defined for all the base stations which support 256 QAM. When it is needed to configure UE to use 256 QAM, the base station uses a high layer signaling to configure UE to use MCS table which supports 256 QAM.

Assuming that average channel status of one UE is very good and can support 256 QAM, then, the possibility that the same UE needs to adopt a modulation mode of lower modulation order is usually small. Therefore, one way of generating MCS table which supports 256 QAM can be to remove some MCS items having lower modulation order from the existing MCS table and add items which uses 256 QAM. A preferred way of the present application is described as follows. Here, consistent with the existing MCS table, the largest MCS values can only indicate modulation order while not contain TBS information. The following description mainly refers to other MCS items which simultaneously indicate modulation order and TBS.

In the first kind of ways, one way of generating MCS table which supports 256 QAM can be to remove some QPSK items having the lowest coding rate from the existing MCS table, renumber the remaining MCS items for QPSK/16 QAM/64 QAM in return starting from 0, and then add items for 256 QAM. For example, removing 5 items having the lowest index from the existing MCS table, 5 items which support 256 QAM can be added accordingly.

For situations in which channels of UE can support 256 QAM, in order to deal with the case of deep fading occurring on the channels of UE, it may be necessary to retain some QPSK items having lower coding rate. In this way, when configuring MCS table of 256 QAM, another way of generating MCS table which supports 256 QAM can be to, on the premise of keeping some QPSK items having lowest or lower coding rate in the existing MCS table unchanged, remove some QPSK, even 16 QAM items, renumber the remaining MCS items for QPSK/16 QAM/64 QAM in return, and then add items for 256 QAM. For example, removing indexes 2~6 from the existing MCS table, 5 items which support 256 QAM can be added accordingly. Here, some MCS items refer to one or more MCS items.

Moreover, in existing MCS table, some MCS items are actually directly corresponding to CQI items in CQI table, while other MCS items can be obtained through interpolation, thus, still another way of generating MCS table which supports 256 QAM can be to remove MCS items obtained through interpolation and whose spectrum efficiencies are within a specified range (such as MCS items having lower spectrum efficiency) from the existing MCS table, renumber the remaining MCS items for QPSK/16 QAM/64 QAM in return starting from 0, and then add items for 256 QAM. For example, removing indexes 1, 3, 5, 7 and 9 from the existing MCS table, 5 items which support 256 QAM can be added accordingly.

In fact, there is a corresponding relationship between CQI items of CQI table and MCS items of MCS table, thus, if removing some CQI items from the existing CQI tale when generating CQI table which supports 256 QAM, then accordingly, removing MCS items corresponding to the removed CQI items from the existing MCS table, renumber the remaining MCS items for QPSK/16 QAM/64 QAM in return, and then add items for 256 QAM.

All the above ways are to remove some items from the existing MCS table and renumber the remaining MCS items; when defining new MCS table which supports 256 QAM, some items to be removed from MCS table can also be directly replaced with items of 256 QAM, without changing modulation orders and TBS represented by other MCS items of MCS table. Specifically, corresponding to the above ways of removing MCS table items, QPSK items having lower coding rate of the existing MCS table can be replaced with items of 256 QAM; or, on the premise of keeping some QPSK items having lowest or lower coding rate in the existing MCS table, some QPSK even 16 QAM items can be replaced with items of 256 QAM; or, MCS items obtained through interpolation and having lower spectrum efficiencies in the existing MCS table can be replaced with items of 256 QAM; or, consistent with the way of generating CQI table which supports 256 QAM, MCS items in the existing MCS table corresponding to the removed CQI items can be replaced with items of 256 QAM; or, since MCS index 0, i.e., $I_{MCS}=0$, has other special purpose, thus, redefining $I_{MCS}=0$ as indicating 256 QAM modulation mode can be avoided and one or more other MCS items with $I_{MCS}>0$ can be replaced with items indicating 256 QAM. The present invention does not specifically limit using which MCS items with $I_{MCS}>0$ to indicate 256 QAM modulation mode. Here, when using the transmission mode of dual transmission block (TB), for example, in DCI formats 2, 2A, 2B, 2C and 2D, $I_{MCS}=0$ and $rv_{idx}=1$ can be set for one corresponding TB to indicate that this TB is not currently transmitted. If $I_{MCS}=0$ is reused to indicate 256 QAM modulation mode, it will result in that $rv_{idx}=1$ cannot be used for HARQ retransmission, thereby affecting performance of 256 QAM data transmission, thus, the MCS index with $I_{MCS}=0$ cannot be used to indicate 256 QAM modulation mode.

This way can ensure that confusion of MCS information in DCI will not occur when configuring or reconfiguring downlink transmission mode. According to LTE system design, for each downlink transmission mode, UE simultaneously detects two kinds of DCI formats, i.e., normal format and fallback format. In this method, when the network configures UE to use MCS table supporting 256 QAM, the two kinds of DCI formats can simultaneously use MCS table supporting 256 QAM. For some MCS items contained in new MCS table supporting 256 QAM, the represented modulation orders and TBS have the same definition as that of corresponding MCS indexes in the existing MCS table, thus, when configuring or reconfiguring downlink transmission mode, so long as using fallback DCI format and consistent MCS items of the two tables, confusion of MCS information in DCI can be avoided.

In the above ways of generating MCS table which supports 256 QAM, MCS items having lower modulation order can be reduced to indicate 256 QAM modulation mode. In fact, MCS table in the existing standard can support 64 QAM and coding rate as high as 0.92, on the premise that UE can support 256 QAM, the performance of using 64 QAM and coding rate as high as 0.92 may be not optimized, and they may be replaced with some MCS items which based on 256 QAM transmission. That is to say, in the present application, in addition to the above mentioned reducing some MCS items having lower modulation order to indicate 256 QAM, one or more items of 64 QAM having highest coding rate can be removed to indicate 256 QAM modulation mode and corresponding TBS. Specifically, one manner of removing one or more items of 64 QAM to indicate 256 QAM, can be used separately to generate new MCS table, and can also be combined with the above mentioned manner of reducing some MCS items having lower modulation order to indicate 256 QAM to generate new MCS table.

Further, in existing MCS table, there are some MCS items which have equal spectrum efficiencies and different modulation modes. That is, MCS indexes 10 and 11 have equal spectrum efficiencies, but they adopt QPSK and 16 QAM, respectively; MCS indexes 16 and 17 have equal spectrum efficiencies, but they adopt 16 QAM and 64 QAM, respectively. One of the two MCS having equal spectrum efficiencies can be removed, thereby obtaining one code word for indicating 256 QAM transmission. For example, one of two MCS having equal spectrum efficiencies, which has lower modulation order, can be removed. Adoption of this method, two code words can be obtained for indicating 256 QAM transmission.

A second kind of ways is to add items corresponding to 256 QAM in MCS table of the existing version of LTE, thereby obtaining a long MCS table of a length more than 32 items, i.e., the long MCS table contains information of more than 32 items of MCS indexes. At this moment, since the length of the MCS table is more than 32 items, thus, it is needed to reconsider reporting manner of MCS information.

One reporting manner can be to add number of bits occupied by CQI information in DCI format; for example, using 6 bits to support MCS information.

Or, 5 bit MCS can also remain unchanged, and thus the DCI format of the existing version of LTE can be directly be reused. When it is needed to configure UE to use 256 QAM, the base station uses a high layer signaling to configure an offset value v of MCS table for UE, and UE extracts 32 MCS items from the above long MCS table according to the offset value v so as to form a MCS table which actually configures UE. For example, in the actual configuration CQI table, consistent with structure of the existing MCS table, MCS values 28, 29, 30 and 31 in DCI indicate modulation orders 2, 4, 6 and 8, respectively (i.e., corresponding to QPSK, 16 QAM, 64 QAM and 256 QAM, respectively); MCS value m (m is equal to 0~27) can be mapped in turn to MCS index m+v of the above long MCS table. Corresponding to base stations which are of different levels and support using 256 QAM, UE can be configured with different offset values v, thereby optimizing performance of downlink link.

The ways of generating MCS table which supports 256 QAM are described above. For UE supporting 256 QAM, adoption of MCS table of the existing LTE standard or MCS table which supports 256 QAM can be configured. In some situations, MCS table of the existing version of LTE has already suitable for downlink transmission of UE; while in some other situations, MCS table which are newly defined for supporting 256 QAM is more suitable for improving peak downlink transmission rate of UE. One way of configuring MCS table of the existing LTE standard or MCS table which supports 256 QAM according to the present application is described below.

According to LTE system design, for each downlink transmission mode, UE simultaneously detects two kinds of DCI formats, i.e., normal format and fallback format. The normal DCI format is to complete normal data transmission under this kind of transmission mode. For situations of needing to configure UE to use 256 QAM, obviously, the normal DCI format is able to support 256 QAM. The fallback DCI format usually has fewer bits, has high reliability and supports switching between downlink transmission modes. So, the pursuit of peak downlink speed is not the main purpose of the fallback DCI format.

In the present application, for normal DCI format and fallback DCI format detected by UE, different MCS tables can be respectively used. Specifically, for UE configured to support 256 QAM, MCS field of normal DCI format can use MCS table which supports 256 QAM, i.e., high layer signaling can be used to configure using one of MCS table of the existing LTE standard and MCS table supporting 256 QAM; while MCS field of fallback DCI format is still consistent with the existing LTE standard, i.e., uses MCS table of the existing LTE standard. When the base station schedules downlink data transmission, according to selected normal DCI format or fallback DCI format, according to the method of the present application, the base station selects MCS table to configure MCS of DCI. Accordingly, when UE detects (E)PDCCH in blind, if UE detects (E)PDCCH of normal DCI format in blind, assuming that the high layer signaling configures using MCS table supporting 256 QAM, UE can parse MCS information of DCI according to new MCS table which supports 256 QAM; otherwise, UE can parse MCS information of DCI according to MCS table of the existing LTE standard; if UE detects (E)PDCCH of fallback DCI format in blind, UE can parse MCS information of DCI according to MCS table of the existing LTE standard.

Adoption this way, no matter whether UE is configured with downlink transmission of 256 QAM, fallback DCI format of UE is consistent with the existing LTE standard, thereby ensuring that confusion of MCS information in DCI will not occur when configuring or reconfiguring downlink transmission mode.

According to specification of version 11 of LTE, for transmission mode 10, the system can configure 4 different kinds of configuration information of RE mapping and quasi-co-location (QCL) of PDSCH, and uses 2 bits of DCI format to indicate current PPDSCH transmission is which kind of RE mapping and QCL configuration. For each of the different RE mapping and QCL configuration, its target physical layer transmission technology may be different, for example, joint transmission (JT) or Coordinated scheduling/beamforming (CS/CB). Using different transmission technologies, link statuses are also different. For example, when using JT, SINR may be higher than CS/CB, so that it may be possible to use MCS table supporting 256 QAM when using JT; while using CS/CB, it is only suitable to using the existing MCS table.

The present application provides that, when configuring Remapping and QCI configuration of PDSCH for UE, MCS tables used corresponding to each RE mapping and QCL configuration are simultaneously configured, respectively. When the base station schedules downlink data transmission, after selecting RE mapping and QCL configuration of PDSCH to be used by UE, configures MCS field of DCI according to MCS table which configures this RE mapping and QCL configuration. Accordingly, after UE detects one (E)PDCCH in blind, determines MCS table according to RE mapping and QCL configuration of PDSCH indicated by (E)PDCCH, and parses MCS information of DCI.

According to LTE system design, UE needs to detect in blind (E)PDCCH sent form the base station within two search space, i.e., common search space (CSS) and UE-specific search space (USS). (E)PDCCH transmitted in USS is usually to trigger UE specific PDSCH transmission; while CSS is to send some cell-common (E)PDCCHs. Further, for DCI formats having equal bit numbers in USS and CSS, (E)PDCCH of CSS can also trigger UE specific PDSCH transmission. For UE configured to support 256 QAM, (E)PDCCH of USS is required to be able to support 256 QAM; while (E)PDCCH of CSS is not required to use MCS table supporting 256 QAM. Or, for UE configured to support 256 QAM, (E)PDCCH of USS is required to be able to support 256 QAM; for CSS, it can be configured by different MCS tables according to purpose of (E)PDCCH sent by the CSS.

In the present application, MCS table to be used can be determined according to whether (E)PDCCH detected by UE is in USS or CSS. Specifically, for UE configured to supporting 256 QAM, MCS table supporting 256 QAM can be used for (E)PDCCH in USS, i.e., high layer signaling can be used to configure using one of MCS table of the existing LTE standard and MCS table supporting 256 QAM; MCS table of the existing LTE standard can be fixed used for (E)PDCCH in CSS. When the base station schedules downlink data transmission, for (E)PDCCH in USS and CSS, MCS table selected according to the method of the present application can be used to configure MCS field of DCI. Accordingly, when UE detects in blind (E)PDCCH, for (E)PDCCH in USS, assuming that the high layer signaling configures using MCS table supporting 256 QAM, MCS information of DCI can be parsed according to MCS table supporting 256 QAM, otherwise, MCS information of DCI can be parsed according to MCS table of the existing LTE standard; for (E)PDCCH in CSS, MCS information of DCI can be parsed according to MCS table of the existing LTE standard.

Or, for UE configured to supporting 256 QAM, MCS table supporting 256 QAM can be used for (E)PDCCH in USS, i.e., high layer signaling can be used to configure using one of MCS table of the existing LTE standard and MCS table supporting 256 QAM; for (E)PDCCH in CSS, if its DCI is cell specific, such as scheduling broadcast information, paging information or RACH response message (RAR), then (E)PDCCH uses MCS table of the existing LTE standard. For (E)PDCCH in CSS, if its DCI is UE specific, then (E)PDCCH can use MCS table supporting 256 QAM. When the base station schedules downlink data transmission, for (E)PDCCH in USS and CSS, using MCS table selected according to the method of the present application to configure MCS field of DCI. Accordingly, when UE detects in blind (E)PDCCH, for (E)PDCCH in USS, assuming that the high layer signaling configures using MCS table supporting 256 QAM, MCS information of DCI can be parsed according to MCS table supporting 256 QAM; for (E)PDCCH in CSS, if its DCI is cell specific, then MCS information of DCI can be parsed according to MCS table of the existing LTE standard; for (E)PDCCH in CSS, if its DCI is UE specific, assuming that the high layer signaling configures using MCS table supporting 256 QAM, then MCS information of DCI can be parsed according to MCS table supporting 256 QAM; otherwise, MCS information of DCI can be parsed according to MCS table of the existing LTE standard.

In LTE system, one (E)PDCCH is an aggregation of one or more (E)CCE. Generally, when downlink channel quality of UE is good, a smaller aggregation level can be adopted; while downlink channel quality of UE is poor, a larger aggregation level can be used. Accordingly, for downlink data transmission, when downlink link quality is good, 256 QAM modulation mode may be adopted; while when downlink link quality is poor, 256 QAM modulation mode usually cannot be adopted.

In the present application, MCS table used by DCI can be determined according to aggregation level of (E)PDCCH. For example, (E)PDCCH with an aggregation level smaller than K can use new MCS table which supports 256 QAM; (E)PDCCH with an aggregation level greater than K uses the existing MCS table. When the base station schedules downlink data transmission, determines an aggregation level of (E)PDCCH according to downlink link status of UE, and selects MCS table according to the method of the present application to configure MCS field of DCI. Accordingly, after UE detects (E)PDCCH in blind, UE can parse MCS field of DCI according to the aggregation level of (E)PDCCH to obtain modulation mode and TBS of base station scheduling.

In LTE system, two types of EPDCCH are defined, i.e., localized EPDCCH and distributed EPDCCH. Generally, localized EPDCCH is suitable for situations in which the base station can obtain precise channel state indication (CSI) information of different frequency subbands of UE, so as to obtain frequency scheduling gain; correspondingly, when the base station does not have precise CSI information of UE, the base station has to distribute EPDCCH in multiple PRB pairs for sending, so as to obtain frequency diversity gain, i.e., distributed EPDCCH. In case of the base station sending localized EPDCCH, since CSI information is precise, thus, 256 QAM can be used to further improve downlink peak rate. While in case of the base station sending distributed EPDCCH, CSI information is usually not precise, MCS table of the existing LTE standard can provide good performance.

In the present application, MCS table used by DCI can be determined according to types (localized or distributed) of EPDCCH. Specifically, EPDCCH candidates in a localized EPDCCH set can be configured to use new MCS table supporting 256 QAM, i.e., high layer signaling can be used to configure using one of MCS table of the existing LTE standard and MCS table supporting 256 QAM; while EPDCCH candidates in a distributed EPDCCH set can be configured to use existing MCS table. When the base station schedules downlink data transmission, types (localized or distributed) of EPDCCH can be selected according to downlink link status of UE, and MCS table can be selected according to the method of the present application to configure MCS field of DCI. Accordingly, after UE detects EPDCCH in blind, UE can parse MCS field of DCI according to types (localized or distributed) of EPDCCH in accordance with the method of the present application to obtain modulation mode and TBS of base station scheduling.

In version 11 of LTE, supporting configuring UE with 2 EPDCCH sets. For downlink transmission mode 10, RE mapping and QCL configuration of each EPDCCH set is consistent with one RE mapping and QCL configuration of PDSCH. For each RE mapping and QCL configuration of PDSCH, its target physical layer transmission technology may be different, accordingly, its link statuses are also different. For example, when using JT, SINR may be higher than CS/CB, so that it may be possible to use MCS table supporting 256 QAM when using JT. In this way, there can be a certain corresponding relationship between EPDCCH set and link status when transmitting PDSCH.

In the present application, each EPDCCH set of UE can be configured to use different MCS tables, respectively, i.e., when configuring parameters of the each EPDCCH set, the each EPDCCH set can be further configured to use one of MCS table of the existing LTE standard and MCS table supporting 256 QAM. When the base station schedules downlink data transmission, DCI information can be transmitted in an EPDCCH candidate of one EPDCCH set of UE, MCS field of DCI can be configured according to MCS table configured by selected EPDCCH set. Accordingly, after UE detects (E)PDCCH in blind, UE can determine MCS table according to the EPDCCH set to which the EPDCCH belongs, and parse MCS field of DCI.

Figure 4:
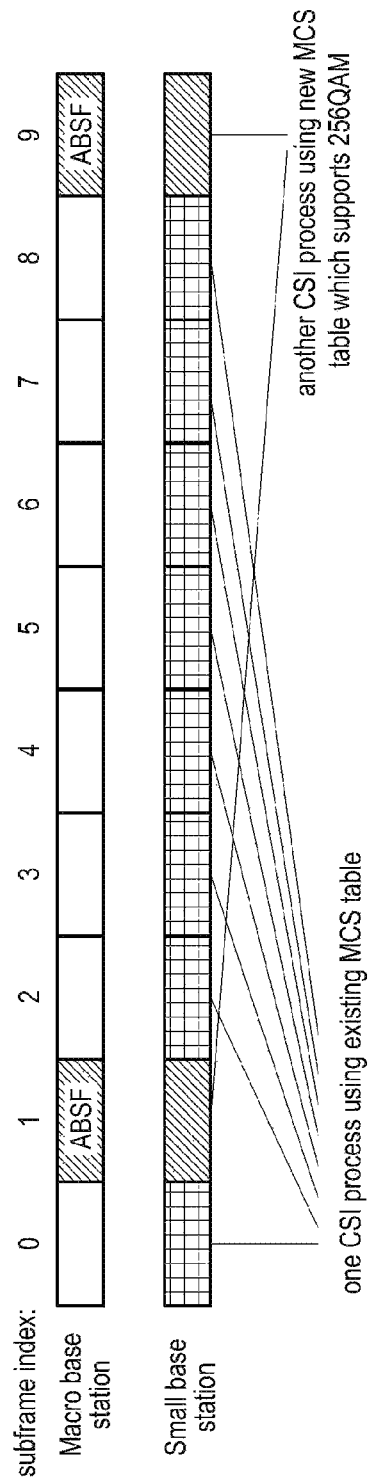
FIG. 4 is a schematic diagram showing different downlink subframe sets corresponding to different MCS tables.

In the version 10 of LTE, in order to support eICIC technique, downlink subframes of a cell can be divided into two sets, and channel statuses of the two are different. As shown in FIG. 4, a subframe set configured with ABSF corresponds to macro base station, that is, interference on a smaller cell from the macro base station is smaller, thus, SINR of UE can be very high and may be suitable for using the modulation mode of 256 QAM. For the set of other subframes, since the macro base station sends downlink control and downlink data, thus, SINR of UE is smaller and may not support the modulation mode of 256 QAM.

In the present application, the network can divide downlink subframes into multiple sets, for example, different downlink subframe sets have different degrees of interference; for each downlink subframe set, configures MCS table used by DCI which schedules downlink data transmission of each downlink subframe set. If defining new table for 256 QAM, then, in the present application, UE is configured to use MCS table of the existing version of LTE or new MCS table which supports 256 QAM, according to SINR situation of each downlink subframe set. If defining the above long MCS table, then, in the present application, UE is configured to select an offset value v of MCS index from the long MCS table, according to SINR situation of each downlink subframe set. After UE receives the above configuration information of MCS table for different downlink subframe sets, when detecting DCI format scheduling downlink transmission of one downlink subframe set, UE can parse modulation mode and TBS of base station scheduling according to MCS table configured for downlink subframe set by network.

Figure 5:
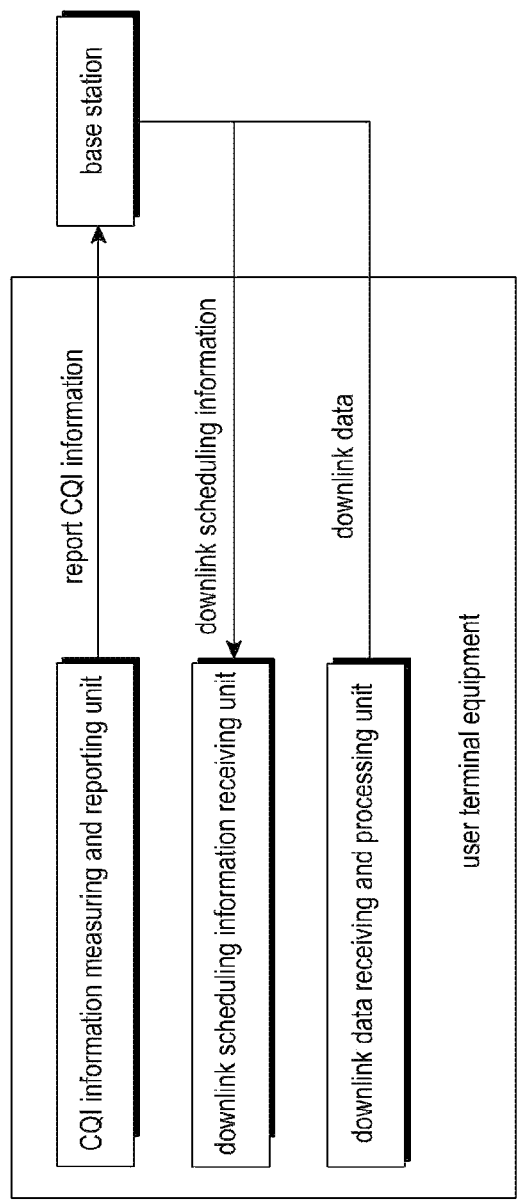
FIG. 5 is a schematic diagram of a user terminal equipment of the present application.

The present application also provides a user terminal equipment which can be used to implement the above downlink transmission method. FIG. 5 is a schematic diagram of a user terminal equipment of the present application. As shown in FIG. 5, the equipment includes: a CQI information measuring and reporting unit, a downlink scheduling information receiving unit and a downlink data receiving and processing unit.

The CQI information measuring and reporting unit is configured to measure and report downlink channel quality indicator (CQI) information to a base station. Here, UE can report the above CQI information according to a backward compatible CQI table or a CQI table which supports 256 QAM modulation.

The downlink scheduling information receiving unit is configured to receive downlink scheduling information sent from the base station.

The downlink data receiving and processing unit is configured to, according to MCS information of DCI included in the downlink scheduling information, receive and process accordingly downlink data sent from the base station. Here, UE can process MCS information according to a backward compatible MCS table or a MCS table which supports 256 QAM modulation.

It can be seen from the above specific implementations of the present application, application of the method and equipment of the present application can generate CQI table and MCS table which support 256 QAM transmission, and supports selecting utilization of CQI/MCS tables of the existing LTE standard or selecting utilization of CQI/MCS tables which support 256 QAM transmission according to link status of UE, thereby optimizing performance of downlink transmission.

Various embodiments disclosed herein are provided merely to describe technical details of the present disclosure and to help in the understanding of the present disclosure, and do not limit the scope of the present disclosure. Accordingly, the scope of the present disclosure should be construed as including all modifications or various other embodiments based on the technical idea of the present disclosure as defined by the following claims and their equivalents.

What is claimed:

1. A method for communication by a user equipment in a wireless communication system, the method comprising:
   receiving configuration information from a base station;
   performing measurement of a downlink channel based on the configuration information;
   identifying a channel quality indicator (CQI) table among a plurality of CQI tables including a first CQI table which includes CQI indices related to 256 quadrature amplitude modulation (QAM) and a second CQI table which does not include any CQI index related to the 256 QAM;
   identifying a CQI index in the identified CQI table based on the measurement; and
   reporting the identified CQI index to the base station,
   wherein each of the plurality of CQI tables includes CQI indices indicating modulations and code rates, and
   wherein an item of 64 QAM with a highest code rate indicated in the second CQI table is absent in the first CQI table.

2. The method of claim 1,
   wherein a number of CQI indices in the first CQI table is equal to a number of CQI indices in the second CQI table.

3. The method of claim 1,
   wherein the CQI table is identified among the plurality of CQI tables based on information received from the base station.

4. The method of claim 1,
wherein CQI items in the first CQI table except at least one CQI item of the 256 QAM are in the second CQI table.

5. A user equipment (UE) comprising:
a transceiver; and
at least one processor coupled to the transceiver, wherein the at least one processor is configured to:
   receive configuration information from a base station;
   perform measurement of a downlink channel based on the configuration information;
   identify a channel quality indicator (CQI) table among a plurality of CQI tables including a first CQI table which includes CQI indices related to 256 quadrature amplitude modulation (QAM) and a second CQI table which does not include any CQI index related to the 256 QAM;
   identify a CQI index in the identified CQI table based on the measurement; and
   report the identified CQI index to the base station,
wherein each of the plurality of CQI tables includes CQI indices indicating modulations and code rates, and
wherein an item of 64 QAM with a highest code rate indicated in the second CQI table is absent in the first CQI table.

6. The UE of claim 5,
wherein a number of CQI indices in the first CQI table is equal to a number of CQI indices in the second CQI table.

7. The UE of claim 5,
wherein the CQI table is identified among the plurality of CQI tables based on information received from the base station.

8. The UE of claim 5,
wherein CQI items in the first CQI table except at least one CQI item of the 256 QAM are in the second CQI table.

9. A method for communication by a base station in a wireless communication system, the method comprising:
   transmitting configuration information for measurement of a downlink channel to a user equipment (UE); and
   receiving, from the UE, a report including a CQI index which is identified based on the measurement in a CQI table among a plurality of CQI tables including a first CQI table which includes CQI indices related to 256 quadrature amplitude modulation (QAM) and a second CQI table which does not include any CQI index related to the 256 QAM,
wherein each of the plurality of CQI tables includes CQI indices indicating modulations and code rates, and
wherein an item of 64 QAM with a highest code rate indicated in the second CQI table is absent in the first CQI table.

10. The method of claim 9,
wherein a number of CQI indices in the first CQI table is equal to a number of CQI indices in the second CQI table.

11. The method of claim 9, further comprising transmitting, to the UE, information for identifying the CQI table among the plurality of CQI tables.

12. The method of claim 9,
wherein CQI items in the first CQI table except at least one CQI item of the 256 QAM are in the second CQI table.

13. A base station in a wireless communication system, the base station comprising:
a transceiver; and
at least one processor coupled to the transceiver, wherein the at least one processor is configured to:
   transmit configuration information for measurement of a downlink channel to a user equipment (UE), and
   receive, from the UE, a report including a CQI index which is identified based on the measurement in a CQI table among a plurality of CQI tables including a first CQI table which includes CQI indices related to 256 quadrature amplitude modulation (QAM) and a second CQI table which does not include any CQI index related to the 256 QAM,
wherein each of the plurality of CQI tables includes CQI indices indicating modulations and code rates, and
wherein an item of 64 QAM with a highest code rate indicated in the second CQI table is absent in the first CQI table.

14. The base station of claim 13,
wherein a number of CQI indices in the first CQI table is equal to a number of CQI indices in the second CQI table.

15. The base station of claim 13,
wherein the at least one processor is further configured to transmit, to the UE, information for identifying the CQI table among the plurality of CQI tables.

16. The base station of claim 13,
wherein CQI items in the first CQI table except at least one CQI item of the 256 QAM are in the second CQI table.

* * * * *